(12) United States Patent
Watarai et al.

(10) Patent No.: US 10,023,139 B2
(45) Date of Patent: Jul. 17, 2018

(54) BICYCLE CONTROL SYSTEM

(71) Applicant: Shimano Inc., Sakai, Osaka (JP)

(72) Inventors: Etsuyoshi Watarai, Osaka (JP); Hideki Ikemoto, Osaka (JP); Takeshi Oi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/287,127

(22) Filed: May 26, 2014

(65) Prior Publication Data
US 2015/0009019 A1    Jan. 8, 2015

(30) Foreign Application Priority Data

Jul. 5, 2013  (JP) .................................. 2013-141967
Jan. 24, 2014 (JP) .................................. 2014-011235

(51) Int. Cl.
| | | |
|---|---|---|
| *B60R 16/04* | (2006.01) | |
| *B62J 1/08* | (2006.01) | |
| *B62M 9/122* | (2010.01) | |
| *B62M 9/132* | (2010.01) | |
| *G08C 17/02* | (2006.01) | |
| *B62M 25/08* | (2006.01) | |
| *B62K 25/28* | (2006.01) | |
| *B62K 25/04* | (2006.01) | |

(52) U.S. Cl.
CPC ............... *B60R 16/04* (2013.01); *B62J 1/08* (2013.01); *B62M 9/122* (2013.01); *B62M 9/132* (2013.01); *B62M 25/08* (2013.01); *G08C 17/02* (2013.01); *B62J 2001/085* (2013.01); *B62K 25/28* (2013.01); *B62K 2025/044* (2013.01)

(58) Field of Classification Search
CPC .. B60R 16/04; B62J 1/08; B62J 6/003; B62K 25/28; B62M 9/122–9/132; B62M 25/08; G08C 17/02; B60L 11/007; B60L 2200/12; B60L 2250/16
See application file for complete search history.

(56) References Cited

U.S. PATENT DOCUMENTS

| | | | | |
|---|---|---|---|---|
| 5,865,267 A | * | 2/1999 | Mayer ..................... | B62M 6/60 180/206.5 |
| 2002/0014366 A1 | * | 2/2002 | Turner .................... | B62M 6/55 180/220 |
| 2003/0001357 A1 | * | 1/2003 | Fujii ...................... | B62M 25/08 280/260 |
| 2004/0108683 A1 | * | 6/2004 | Oohara .................. | B62M 25/08 280/288.4 |
| 2004/0114407 A1 | * | 6/2004 | Kitamura ................ | B62M 6/45 363/125 |

(Continued)

FOREIGN PATENT DOCUMENTS

| | | |
|---|---|---|
| CN | 1689905 A | 11/2005 |
| WO | 2004/016496 A1 | 2/2004 |

*Primary Examiner* — Orlando Bousono
(74) *Attorney, Agent, or Firm* — Global IP Counselors, LLP

(57) ABSTRACT

A bicycle control system is basically provided with a first power supply, a plurality of electric drive devices and an operating apparatus. The electric drive devices are electrically coupled to the first power supply to receive electric power supplied from the first power supply. The operating apparatus wirelessly operates the electric drive devices by wireless signals.

21 Claims, 9 Drawing Sheets

(56) References Cited

U.S. PATENT DOCUMENTS

| | | | |
|---|---|---|---|
| 2004/0115962 A1* | 6/2004 | Kitamura | B62J 6/18 439/34 |
| 2004/0195025 A1* | 10/2004 | Kitamura | B60L 1/16 180/206.2 |
| 2004/0195839 A1* | 10/2004 | Kitamura | H02J 7/1407 290/1 R |
| 2004/0220712 A1* | 11/2004 | Takeda | B62J 99/00 701/32.5 |
| 2005/0098978 A1* | 5/2005 | Kitamura | B62M 25/045 280/260 |
| 2005/0156590 A1* | 7/2005 | Nagae | G08C 17/00 324/167 |
| 2006/0122015 A1* | 6/2006 | Takamoto | B62M 25/08 474/80 |
| 2006/0186631 A1* | 8/2006 | Ishikawa | B62M 25/08 280/260 |
| 2006/0226879 A1* | 10/2006 | Kitamura | B62M 25/08 327/94 |
| 2007/0037645 A1* | 2/2007 | Ishikawa | B62M 25/08 474/80 |
| 2007/0068319 A1* | 3/2007 | Kitamura | B62M 25/045 74/502.2 |
| 2009/0218154 A1* | 9/2009 | Yee | B62M 6/60 180/220 |
| 2009/0315692 A1* | 12/2009 | Miki | B62M 25/08 340/432 |
| 2010/0218633 A1* | 9/2010 | Ichida | B62M 25/08 74/473.12 |
| 2011/0133542 A1* | 6/2011 | Ratti | B60B 1/003 301/6.5 |
| 2011/0267178 A1* | 11/2011 | Nishihara | B62K 23/02 340/12.39 |
| 2011/0284303 A1* | 11/2011 | Shwartz | B62M 6/70 180/220 |
| 2013/0145885 A1 | 6/2013 | Kitamura et al. | |
| 2014/0214285 A1* | 7/2014 | Wesling | F16H 59/02 701/51 |

\* cited by examiner

BICYCLE CONTROL SYSTEM

CROSS-REFERENCE TO RELATED APPLICATIONS

This application claims priority under 35 U.S.C. § 119 to Japanese Patent Application Nos. 2013-141967, filed Jul. 5, 2013, and 2014-011235, filed Jan. 24, 2014. The entire disclosures of Japanese Patent Application Nos. 2013-141967 and 2014-011235 are hereby incorporated herein by reference.

BACKGROUND

Field of the Invention

This invention generally relates to a bicycle control system. More specifically, the present invention relates to a bicycle control system.

Background Information

Conventionally, a control apparatus that can electrically control a transmission device such as a front derailleur, or a suspension has been known (for example, Japanese Laid-Open Patent Publication No. 2013-121834). Such a control apparatus can operate a transmission device and the like by a wireless signal.

SUMMARY

In order to drive an electric drive device including a transmission device or a suspension as described above, a battery is incorporated into each electric drive device so as to supply electric power to each electric drive device. However, in a case where a battery is incorporated into each electric drive device, the timings for replacing the batteries are different since there is a difference in power consumption between each of the electric drive devices. Therefore, the maintenance of power supply becomes laborious.

The object of the present invention is to simplify the maintenance of power supply in a bicycle control system that includes an electric drive device operated in response to a wireless signal.

According to a first aspect of the present invention, a bicycle control system comprises a first power supply, a plurality of electric drive devices, and an operating apparatus. Each electric drive device is electrically coupled to the first power supply to receive electric power supplied from the first power supply. The operating apparatus wirelessly operates the electric drive devices by wireless signals.

With this configuration, the plurality of electric drive devices are connected to the single first power supply, and electric power is supplied from this first power supply. Therefore, even when the electric drive devices are configured to be operated in response to a wireless signal, the labor for replacing or charging the battery can be reduced.

Preferably, the operating apparatus is electrically coupled to the first power supply to receive electric power supplied from the first power supply. With this configuration, since electric power is supplied from the first power supply to the operating apparatus as well, the labor for replacing or charging the battery can further be reduced.

The bicycle control system may further comprise a second power supply. The second power supply is electrically coupled to the operating apparatus to supply electric power to the operating apparatus. By providing a power supply for the operating apparatus separately from the power supply for the plurality of electric drive devices, the flexibility of the arrangement can be improved.

Preferably, the electric drive devices and the first power supply are configured to be attachable to a frame main body of a bicycle. Also, the operating apparatus and the second power supply are configured to be attachable to a movable member that is movable relative to the frame main body. With this configuration, since there is no cable or the like that extends over the frame main body and the movable member, the movable member can be moved more smoothly relative to the frame main body.

Preferably, the bicycle control system further comprises at least one first wireless communication unit. The at least one first wireless communication unit is operatively connected to the electric drive devices. With this configuration, since the electric drive devices share a single first wireless communication unit, the cost can be reduced.

Preferably, the at least one first wireless communication unit is configured to be attachable in a vicinity of a stem of a frame main body of a bicycle. In a case where the operating apparatus is attached to a stem or a handlebar, the wireless communication distance can be shortened so as to reduce communication errors by attaching the first wireless communication unit in the vicinity of the stem.

The first power supply may be retained in a retaining member that is configured to be attached to the main body of the bicycle. In this case, the at least one first wireless communication unit may be attached to the retaining member.

The at least one first wireless communication unit may be disposed in the first power supply.

The at least one first wireless communication unit may be included as a part of one of the electric drive devices.

Preferably, the first power supply is connected to each electric drive device through an electric power line. The at least one first wireless communication unit is configured to communicate with each of the electric drive devices through the electric power line.

Preferably, the operating apparatus has a second wireless communication unit that transmits a wireless signal to the at least one first wireless communication unit to operate the electric drive device. Since a wireless signal can be transmitted by the single second wireless communication unit, the amount of power consumption can be reduced.

The operating apparatus may include a plurality of operating devices. The at least one second wireless communication unit transmits wireless signals to the at least one first wireless communication unit in response to operation of the operating devices.

The operating apparatus may include a plurality of operating devices and have the at least one second wireless communication unit includes a separate second wireless communication unit for each of the operating devices.

The at least one first wireless communication unit includes a separate first wireless communication unit for each of the electric drive devices. The at least one second wireless communication unit communicates with the separate first wireless communication units. Each first wireless communication unit receives a wireless signal from the corresponding second wireless communication unit. In this case, wireless signals can be transmitted to the plurality of electric drive devices at the same time, and the plurality of electric drive devices can receive the wireless signals at the same time. Therefore, a time lag to an operation of the electric drive device in response to an operation of the operating apparatus can be controlled.

The operating apparatus may include a plurality of operating devices, and the at least one second wireless communication unit transmits wireless signals in response to operation of the operating device.

The first power supply may include one of a primary battery and a secondary battery.

The second power supply may include one of a primary battery and a secondary battery.

The electric drive devices can include at least two of a front transmission device, a rear transmission device, a front suspension device, a rear suspension device and a seat post lifting device.

The operating apparatus may include an operating device. The operating device can include at least one of a gear shifting operating device, a suspension operating device, and a seat post operating device.

According to the present invention, a bicycle control system that can simplify the maintenance of power supply can be provided even if an electric drive device is configured to be operated in response to a wireless signal.

Also other objects, features, aspects and advantages of the disclosed bicycle control system will become apparent to those skilled in the art from the following detailed description, which, taken in conjunction with the annexed drawings, discloses several illustrative embodiment of the bicycle control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
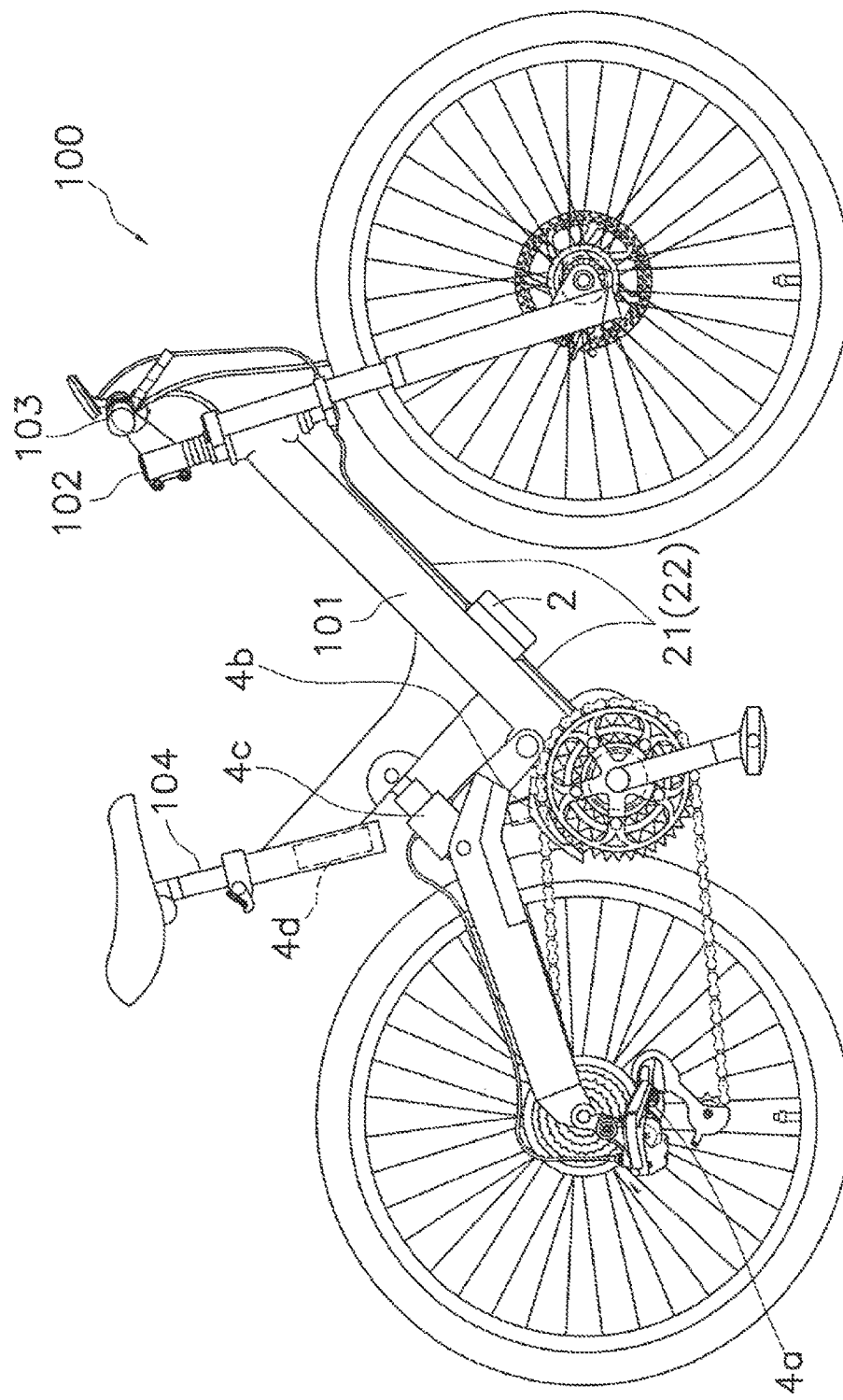
FIG. 1 is a side elevational view of a bicycle that is equipped with a bicycle control system in accordance with a first embodiment.

Referring initially to FIG. 1, a bicycle 10 is illustrated that is equipped with a bicycle control system 12 in accordance with a first embodiment.

First Embodiment

As shown in FIG. 1, a bicycle 100 to which a bicycle control system 1 according to a first embodiment is applied has a frame main body 101, a stem (one example of the movable member) 102, a handlebar (one example of the movable member) 103, and a seat post 104.

Figure 2:
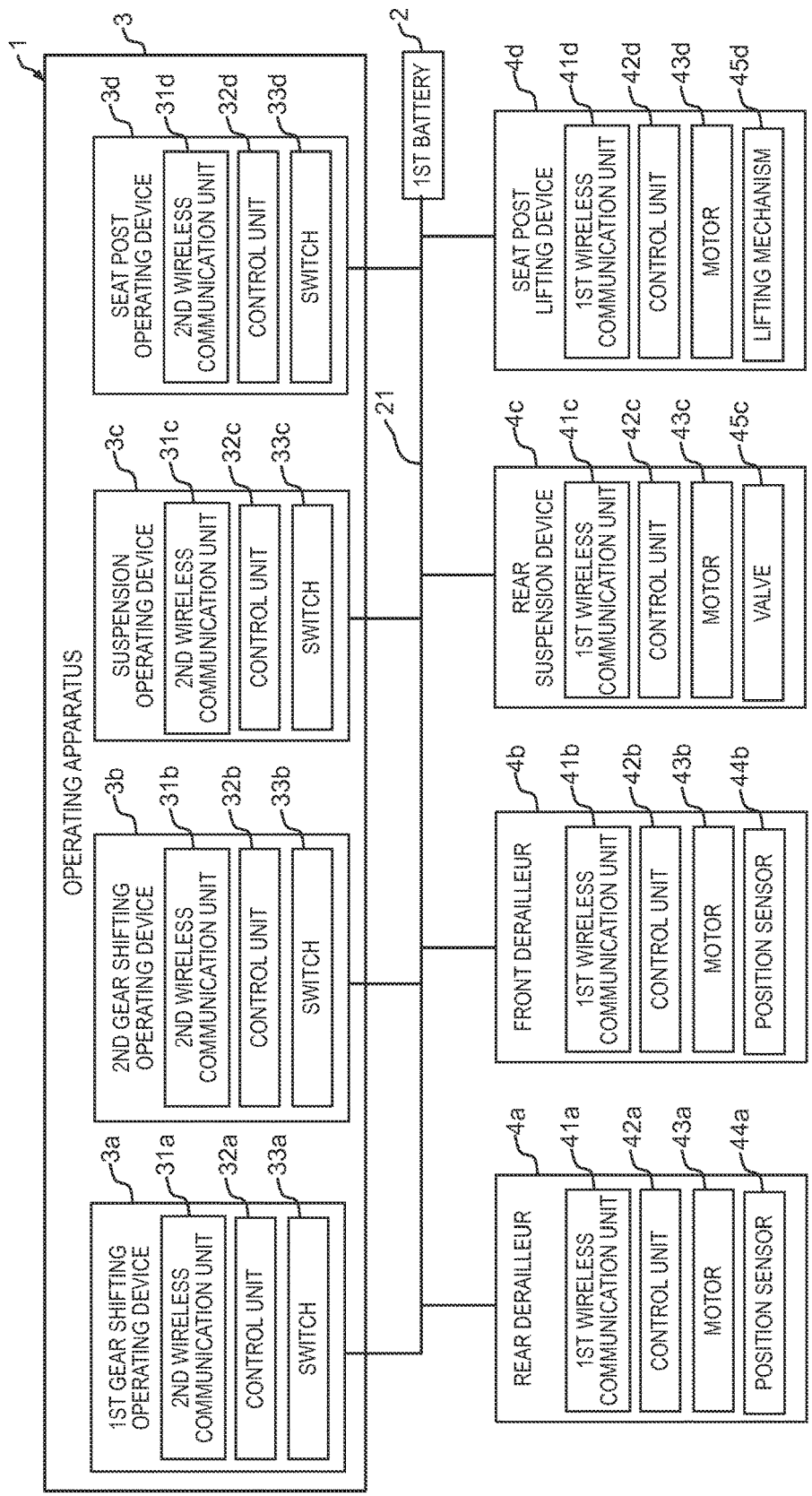
FIG. 2 is a block diagram of a bicycle control system in accordance with the first embodiment.

As shown in FIG. 2, the bicycle control system 1 has a first battery (one example of the first power supply) 2, an operating apparatus 3, and a plurality of electric drive devices 4a-4d. The plurality of electric drive devices 4a-4d are, for example, a rear derailleur (one example of the rear transmission device) 4a, a front derailleur (one example of the front transmission device) 4b, a rear suspension device 4c, and a seat post lifting device 4d. Each of the electric drive devices 4a-4d is attached to the frame main body 101.

The plurality of electric drive devices 4a-4d have first wireless communication unit s 41a-41d, respectively. Specifically, the rear derailleur 4a has the first wireless communication unit 41a. The rear derailleur 4a also has a control unit 42a and a motor 43a in addition to the first wireless communication unit 41a. In the rear derailleur 4a, a gear shifting operation is executed by controlling the motor 43a by the control unit 42a based on a wireless signal received by the first wireless communication unit 41a. The rear derailleur 4a also has a position sensor 44a. The control unit 42a can stop a chain guide plate at a position that corresponds to each gear shifting stage based on detection of the position sensor 44a. The control unit 42a transmits the position that corresponds to each gear shifting stage detected by the position sensor 44a to a second wireless communication unit 31a of a first gear shifting operating device 3a described below through the first wireless communication unit 41a. For example, in a case in which a display device is provided on or connected to the operating apparatus 3, the display device may display information on the position that corresponds to each gear shifting stage received by the second wireless communication unit 31a. The display device may be implemented, for example, by a cycle computer.

The front derailleur 4b has the first wireless communication unit 41b. The front derailleur 4b also has a control unit 42b and a motor 43b in addition to the first wireless communication unit 41b. In the front derailleur 4b, a gear shifting operation is executed by controlling the motor 43b by the control unit 42b based on a wireless signal received by the first wireless communication unit 41b. The front derailleur 4b also has a position sensor 44b. The control unit 42b can stop a chain guide plate at a position that corresponds to each gear shifting stage based on detection of the position sensor 44b. The control unit 42b transmits the position that corresponds to each gear shifting stage detected by the position sensor 44b to a second wireless communication unit 31b of a second gear shifting operating device 3b described below through the first wireless communication unit 41b. For example, in a case in which a display device is provided on or connected to the operating apparatus 3, the display device may display information on the position that corresponds to each gear shifting stage received by the second wireless communication unit 31b.

The rear suspension device 4c has the first wireless communication unit 41c. The rear suspension device 4c also has a control unit 42c, a motor 43c, and a valve 45c in addition to the first wireless communication unit 41c. In the rear suspension device 4c, the control unit 42c controls the valve 45c by controlling the motor 43c based on a wireless signal received by the first wireless communication unit 41c. An operation state of the rear suspension device 4c can be changed by controlling the valve 45c. For example, the rear suspension device 4c can be put in a free state in which the rear suspension device 4c can expand or contract or in a lock state in which the rear suspension device 4c cannot expand nor contract as the operation state. For example, the rear suspension device 4c can also be put in a hard state or a soft state in the free state. The rear suspension device 4c expands or contracts slowly in the hard state compared to in the soft state. The rear suspension device 4c may have a sensor that detects the state of the valve 45. The rear suspension device 4c may transmit information on the valve 45c detected by this sensor to a second wireless communication unit 31c of a suspension operating device 3c described below through the first wireless communication unit 41c. For example, in a case in which a display device is provided on or connected to the operating apparatus 3, the display device may display information on the valve 45c, that is, information on the rear suspension device 4c received by the second wireless communication unit 31c.

The seat post lifting device 4d has the first wireless communication unit 41d. The seat post lifting device 4d also has a control unit 42d, a motor 43d, and a lifting mechanism 45d in addition to the first wireless communication unit 41d. In the seat post lifting device 4d, the control unit 42d controls the lifting mechanism 45d by controlling the motor 43d based on a wireless signal received by the first wireless communication unit 41d. For example, the seat post 104 is constructed of two cylindrical sections that can expand or contract. For example, the lifting mechanism 45d includes a ball screw and a nut. The nut is moved by driving rotation of the ball screw by the motor 43. The motor 43d and the ball screw are disposed in one of the cylindrical sections, and the nut is coupled to the other of cylindrical sections. With this configuration, the nut is moved along the ball screw by driving the motor 43 so as to expand or contract the seat post 104. The seat post lifting device 4d may have a sensor that detects the height of the seat post 104. The seat post lifting device 4d may transmit information on the height of the seat post 104 detected by this sensor to a second wireless communication unit 31d of a seat post operating device 3d described below through the first wireless communication unit 41d. For example, in a case in which a display device is provided on or connected to the operating apparatus 3, the display device may display information on the height of the seat post 104 received by the second wireless communication unit 31d.

The operating apparatus 3 has operating devices 3a-3d that correspond to the electric drive devices 4, respectively. Specifically, the operating apparatus 3 has the first gear shifting operating device 3a, the second gear shifting operating device 3b, the suspension operating device 3c, and the seat post operating device 3d. The operating devices 3a-3d are attached, for example, to the handlebar 103.

The first gear shifting operating device 3a operates the rear derailleur 4a by a wireless signal. The first gear shifting operating device 3a has the second wireless communication unit 31a. The first gear shifting operating device 3a has a control unit 32a and a switch 33a in addition to the second wireless communication unit 31a. By operating the switch 33a of the first gear shifting operating device 3a, the control unit 32a controls the second wireless communication unit 31a, and a wireless signal is transmitted from the second wireless communication unit 31a. The first wireless communication unit 41a of the rear derailleur 4a receives the wireless signal transmitted from the second wireless communication unit 31a of the first gear shifting operating device 3a. The switch 33a of the first gear shifting operating device 3a may be constructed of a single member, or may be constructed of a plurality of members. For example, the switch 33a is made of two members, in which a gear shifting operation of the rear derailleur 4a is executed to accelerate the rear derailleur 4a when operating one of the members and a gear shifting operation of the rear derailleur 4a is executed to decelerate the rear derailleur 4a when operating the other one of the members.

The second gear shifting operating device 3b operates the front derailleur 4b by a wireless signal. The second gear shifting operating device 3b has the second wireless communication unit 31b. The second gear shifting operating device 3b has a control unit 32b and a switch 33b in addition to the second wireless communication unit 31b. By operating the switch 33b of the second gear shifting operating device 3b, the control unit 32b controls the second wireless communication unit 31b, and a wireless signal is transmitted from the second wireless communication unit 31b. The first wireless communication unit 41b of the front derailleur 4b receives the wireless signal transmitted from the second wireless communication unit 31b of the second gear shifting operating device 3b. The switch 33b of the second gear shifting operating device 3b may be constructed of a single member, or may be constructed of a plurality of members. For example, the switch 33b is made of two members, in which a gear shifting operation of the front derailleur 4b is executed to accelerate the front derailleur 4b when operating one of the members and a gear shifting operation of the front derailleur 4b is executed to decelerate the front derailleur 4b when operating the other one of the members.

The suspension operating device 3c operates the rear suspension device 4c by a wireless signal. The suspension operating device 3c has the second wireless communication unit 31c. The suspension operating device 3c has a control unit 32c and a switch 33c in addition to the second wireless communication unit 31c. By operating the switch 33c of the suspension operating device 3c, the control unit 32c controls the second wireless communication unit 31c, and a wireless signal is transmitted from the second wireless communication unit 31c. The first wireless communication unit 41c of the rear suspension device 4c receives the wireless signal transmitted from the second wireless communication unit 31c of the suspension operating device 3c. The switch 33c of the suspension operating device 3c may be constructed of a single member, or may be constructed of a plurality of members. For example, in a case in which the switch 33c is made of two members, the rear suspension device 4c is put in the free state when operating one of the members and the rear suspension device 4c is put in the lock state when operating the other one of the members. Also, in a case in which the switch 33c is made of a single member, the state of the rear suspension device 4c may be switched between the free state and the lock state every time the switch is operated.

The seat post operating device 3d operates the seat post lifting device 4d by a wireless signal. The seat post operating device 3d has the second wireless communication unit 31d. The seat post operating device 3d has a control unit 32d and a switch 33d in addition to the second wireless communication unit 31d. By operating the switch 33d of the seat post operating device 3d, the control unit 32d controls the second wireless communication unit 31d, and a wireless signal is transmitted from the second wireless communication unit 31d. The first wireless communication unit 41d of the seat post lifting device 4d receives the wireless signal transmitted from the second wireless communication unit 31d of the seat post operating device 3d. The switch 33d of the seat post operating device 3d may be constructed of a single member, or may be constructed of a plurality of members. For example, the switch 33d is made of two members, in which the seat post 104 expands when operating one of the members and the seat post 104 contracts when operating the other one of the members.

The first battery 2 is connected to the operating devices 3a-3d and the electric drive devices 4a-4d, and supplies electric power to the operating devices 3a-3d and the electric drive devices 4a-4d. The first battery 2 is provided as a separate member from the operating devices 3a-3d and the electric drive devices 4a-4d.

The first battery 2 is connected to the operating devices 3a-3d and the electric drive devices 4a-4d, through an electric power line 21. For example, the electric power line 21 extending from the first battery 2 is branched so as to be connected to the operating devices 3a-3d and the electric drive devices 4a-4d. Electric power is supplied to the operating devices 3a-3d and the electric drive devices 4a-4d through the electric power line 21. For example, electric power is supplied as direct voltage. The first battery 2 is attached to the frame main body 101. The first battery 2 may be a primary battery (i.e., a portable voltaic cell that is not rechargeable), or may be a secondary battery (i.e., a portable voltaic cell that is rechargeable).

Although the branched electric power line 21 is illustrated in FIG. 2, the operating devices 3a-3d may be connected to the first battery 2 through separate electric power lines. The electric drive devices 4a-4d may be connected to the first battery 2 through separate electric power lines. Alternatively, the first battery 2 may be connected to any one of the operating devices 3a-3d of the operating apparatus 3 by the single electric power line 21 only, and the one of the operating devices 3a-3d, to which the electric power line 21 is connected, may be connected to the other operating devices of the operating devices 3a-3d by the electric power line 21. Furthermore, electric power may be supplied from the first battery 2 by connecting the electric drive devices 4a-4d in a row through separate electric power lines.

Second Embodiment

Figure 3:
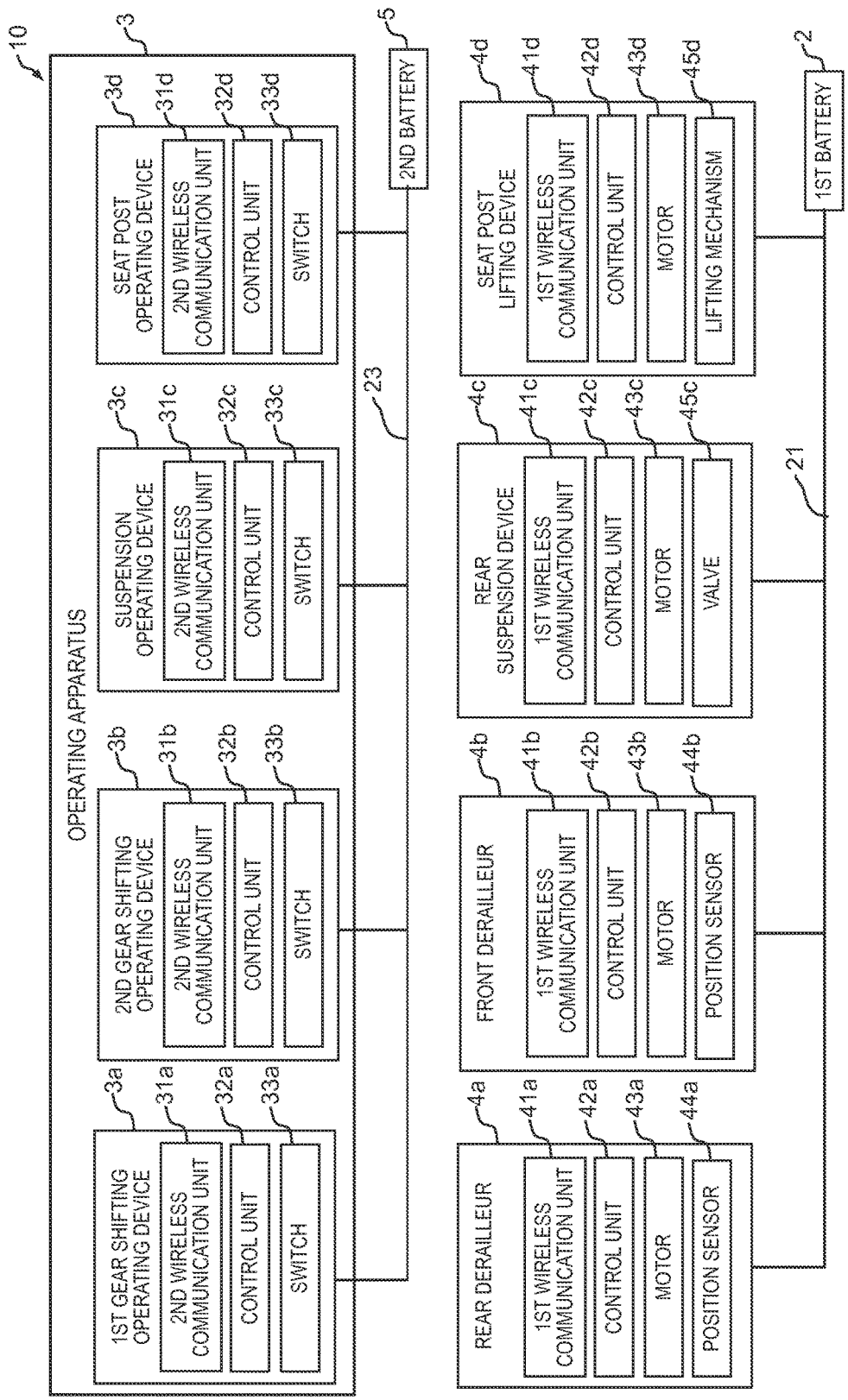
FIG. 3 is a block diagram of a bicycle control system in accordance with a second embodiment.

As shown in FIG. 3, a bicycle control system 10 according to a second embodiment is different from the bicycle control system 1 according to the above-described first embodiment in that the bicycle control system 10 further comprises a second battery (one example of the second power supply) 5. The configuration other than the presence of the second battery 5 is basically the same as in the bicycle control system 1 according to the above-described first embodiment. Therefore, the same reference numerals are assigned to the parts that are configured in the substantially same manner, and overlapping explanations are omitted.

The second battery 5 is provided as a separate member from the operating devices 3a-3d. The second battery 5 is connected to the operating devices 3a-3d, and supplies electric power to the operating devices 3a-3d in a wired manner. The second battery 5 is connected to the operating devices 3a-3d through an electric power line 23. For example, the electric power line 23 extending from the second battery 5 is branched so as to be connected to the operating devices 3a-3d. Electric power is supplied to the operating devices 3a-3d through the electric power line 23. For example, electric power is supplied as direct voltage. The second battery 5 is attached to the stem 102 or the handlebar 103. The first battery 2 may be a primary battery, or may be a secondary battery. Here, the first battery 2 is connected only to the electric drive devices 4a-4d and is not connected to the operating devices 3a-3d. The operating devices 3a-3d may be connected to the second battery 5 through separate electric power lines. Electric power may be supplied from the second battery 5 by connecting the operating devices 3a-3d in a row through separate electric power lines.

Third Embodiment

Figure 4:
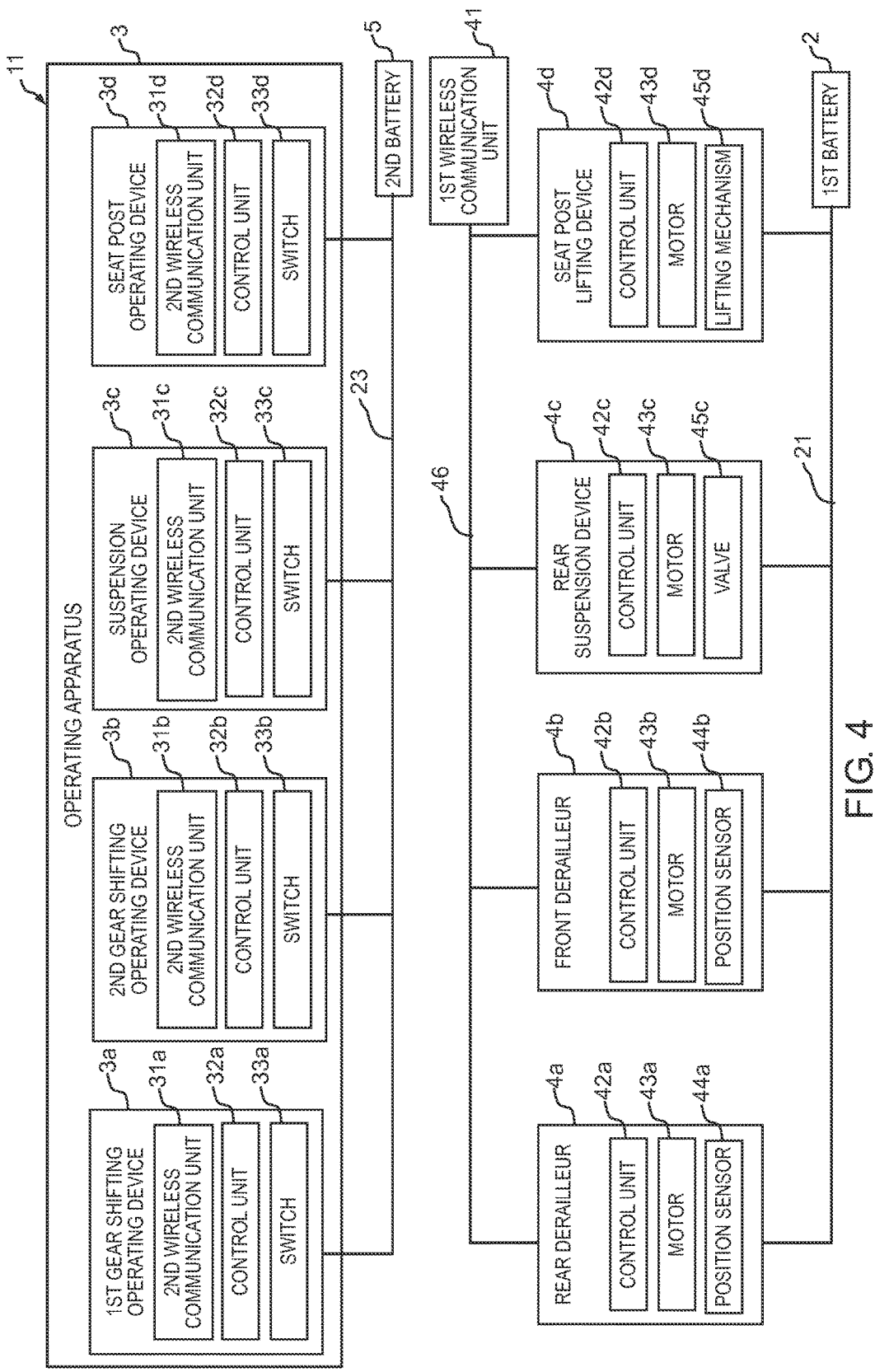
FIG. 4 is a block diagram of a bicycle control system in accordance with a third embodiment.

As shown in FIG. 4, a bicycle control system 11 according to a third embodiment is different from the bicycle control system 1 according to the first embodiment in that the bicycle control system 11 further comprises the second battery 5 and the electric drive devices 4a-4d share a single first wireless communication unit 41. The configuration other than these differences is basically the same as in the bicycle control system 1 according to the above-described first embodiment. Therefore, the same reference numerals are assigned to the parts that are configured in the substantially same manner, and overlapping explanations are omitted. Also, the configuration of the second battery 5 is basically the same as in the bicycle control system 10 according to the above-described second embodiment. Therefore, the same reference numerals are assigned to the parts that are configured in the substantially same manner, and overlapping explanations are omitted.

Figure 5:
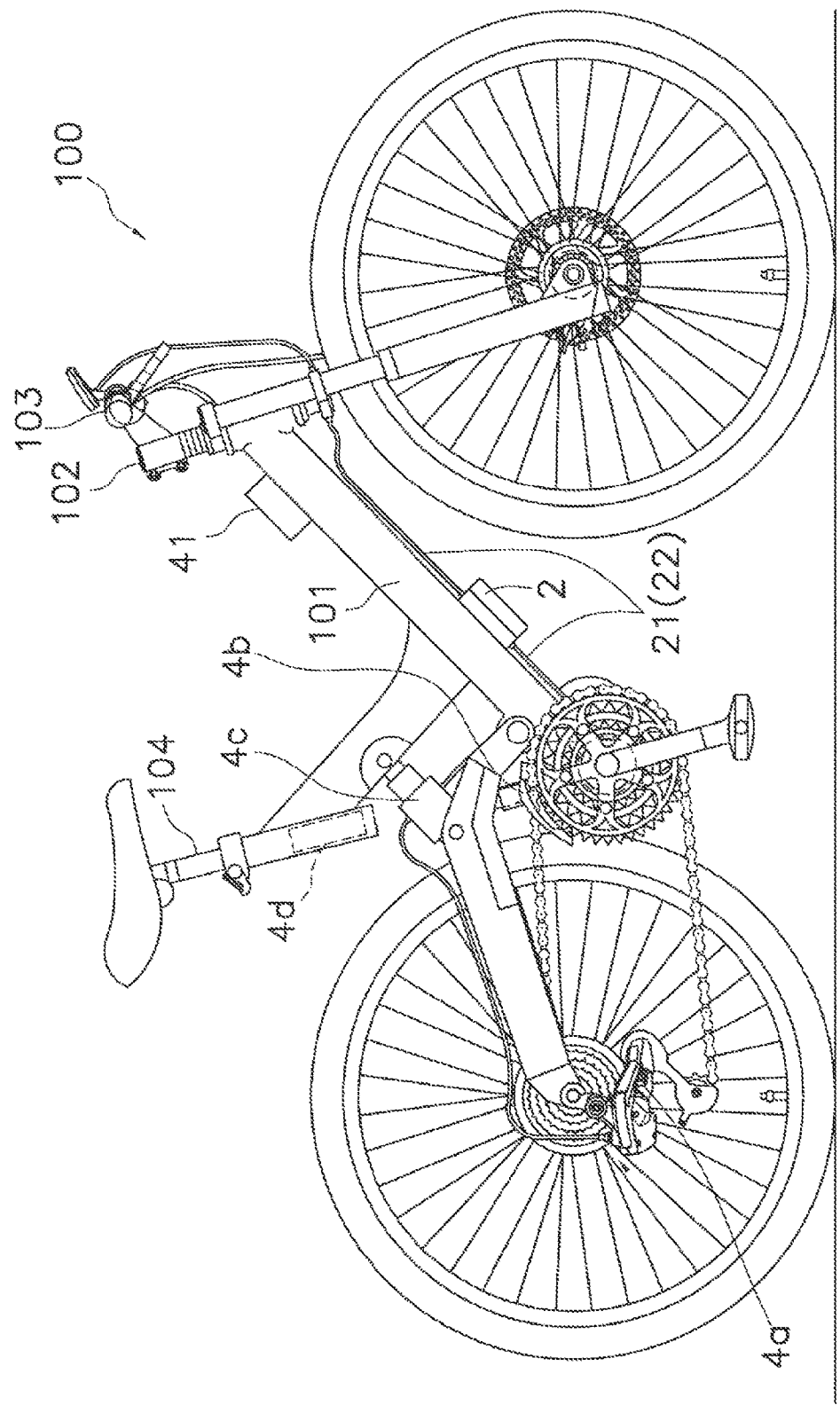
FIG. 5 is a side elevational view of a bicycle that is equipped with a bicycle control system in accordance with the third embodiment.

In the bicycle control system 1 according to the above-described first embodiment, each electric drive device has the first wireless communication unit. Specifically, the bicycle control system 1 according to the first embodiment has the first wireless communication unit s whose number is the same as that of the electric drive devices. In contrast, in the bicycle control system 11 according to the third embodiment, the electric drive devices 4a-4d share the single first wireless communication unit 411. A cable 46 extending from the single first wireless communication unit 41 is branched so as to be connected to the electric drive devices 4a-4d. The first wireless communication unit 41 is attached to the frame main body 101. Preferably, the first wireless communication unit 41 is attached in the vicinity of the stem 102 of the frame main body 101 (see FIG. 5).

The first wireless communication unit 41 receives a wireless signal transmitted from the first gear shifting operating device 3a, and the control unit 42a of the rear derailleur 4a controls the motor 43a so as to execute a gear shifting operation based on the wireless signal.

The first wireless communication unit 41 receives a wireless signal transmitted from the second gear shifting operating device 3b, and the control unit 42b of the front derailleur 4b controls the motor 43b so as to execute a gear shifting operation based on the wireless signal.

The first wireless communication unit 41 receives a wireless signal transmitted from the suspension operating device 3c, and the control unit 42c of the rear suspension device 4c controls the motor 43c based on the wireless signal. The motor 43c controls the valve 45c so as to change the operation state of the rear suspension device 4c.

The first wireless communication unit 41 receives a wireless signal transmitted from the seat post operating device 3d, and the control unit 42d of the seat post lifting device 4d controls the motor 43d so as to change the height of the seat post 104 based on the wireless signal.

Fourth Embodiment

Figure 6:
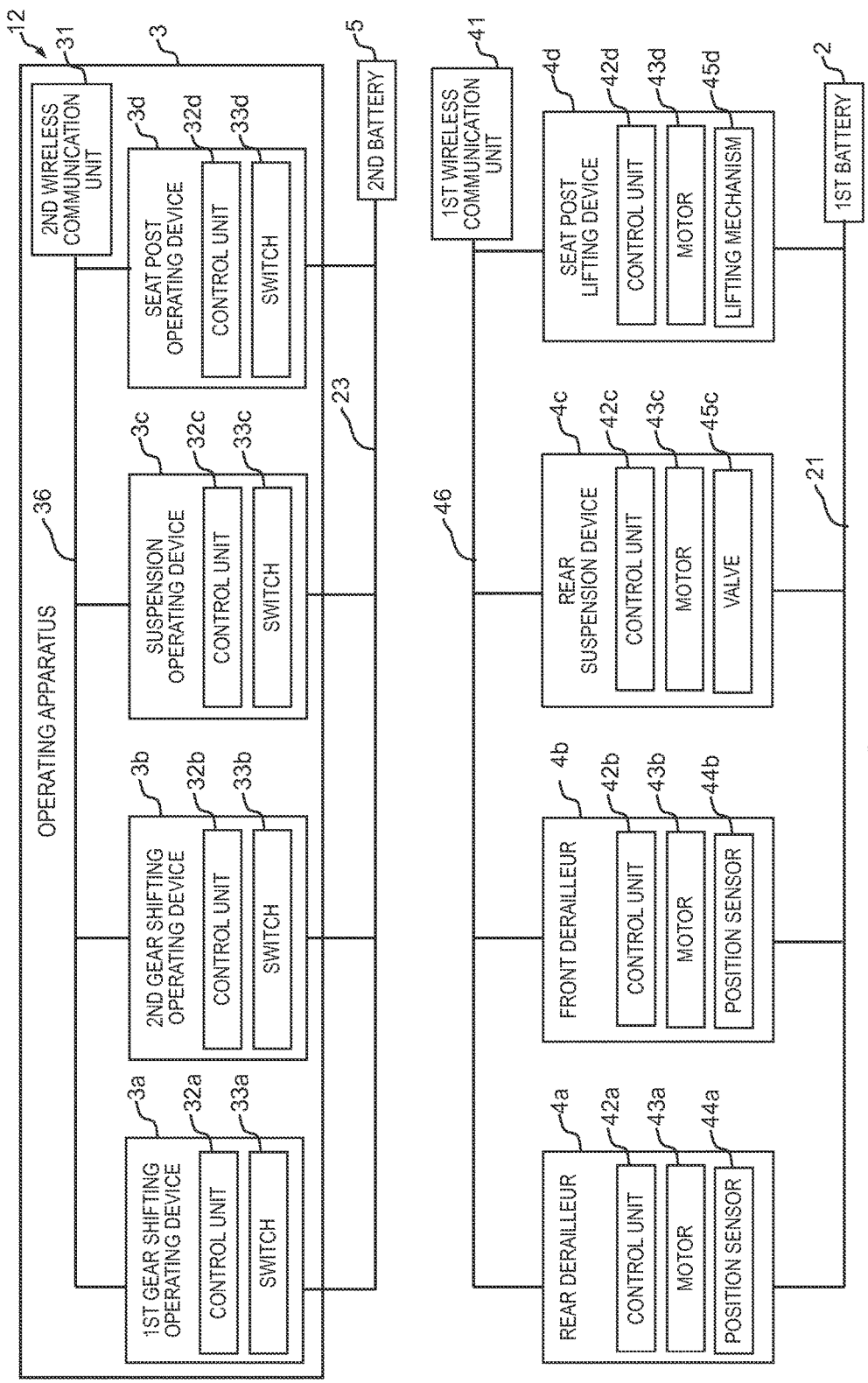
FIG. 6 is a block diagram of a bicycle control system in accordance with a fourth embodiment.

As shown in FIG. 6, a bicycle control system 12 according to a fourth embodiment is different from the bicycle control system 1 according to the first embodiment in that the bicycle control system 12 further comprises the second battery 5, the electric drive devices 4a-4d share the single first wireless communication unit 41, and the operating devices 3a-3d share a single second wireless communication unit 31. The configuration other than these differences is basically the same as in the bicycle control system 1 according to the above-described first embodiment. Therefore, the same reference numerals are assigned to the parts that are configured in the substantially same manner, and overlapping explanations are omitted. Also, the configuration of the second battery 5 is basically the same as in the bicycle control system 10 according to the above-described second embodiment. Therefore, the same reference numerals are assigned to the parts that are configured in the substantially same manner, and overlapping explanations are omitted. Furthermore, the sharing of the first wireless communication unit 41 by the electric drive devices 4a-4d has the same configuration as in the bicycle control system 11 according to the above-described third embodiment. Therefore, the same reference numerals are assigned to the parts that are configured in the substantially same manner, and overlapping explanations are omitted.

In the bicycle control system 1 according to the above-described first embodiment, each operating device has the second wireless communication unit. Specifically, the bicycle control system 1 according to the first embodiment has the second wireless communication unit s whose number is the same as that of the operating devices. In contrast, in the bicycle control system 12 according to the fourth embodiment, the operating devices 3a-3d share the single second wireless communication unit 31. A cable 36 extending from the single second wireless communication unit 31 is branched so as to be connected to the corresponding operating devices 3a-3d, respectively. In this case, the second wireless communication unit 31 is attached to the stem 102 or the handlebar 103.

When operating the first gear shifting operating device 3a, a wireless signal is transmitted from the second wireless communication unit 31, and the wireless signal is received by the first wireless communication unit 41. The control unit 42a of the rear derailleur 4a controls the motor 43a so as to execute a gear shifting operation based on the received wireless signal.

When operating the second gear shifting operating device 3b, a wireless signal is transmitted from the second wireless communication unit 31, and the wireless signal is received by the first wireless communication unit 41. The control unit 42b of the front derailleur 4b controls the motor 43b so as to execute a gear shifting operation based on the received wireless signal.

When operating the suspension operating device 3c, a wireless signal is transmitted from the second wireless communication unit 31, and the wireless signal is received by the first wireless communication unit 41. The control unit 42c of the rear suspension device 4c controls the motor 43c based on the received wireless signal. The motor 43c controls the valve 45c so as to change the operation state of the rear suspension device 4c.

When operating the seat post operating device 3d, a wireless signal is transmitted from the second wireless communication unit 31, and the wireless signal is received by the first wireless communication unit 41. The control unit 42d of the seat post lifting device 4d controls the motor 43d so as to change the height of the seat post 104 based on the received wireless signal.

Although the embodiments of the present invention have been presented heretofore, the present invention is not limited to the embodiments and various modifications can be made without departing from the scope of the invention.

Modified Example 1

Although the first battery 2 is shown as an example of the first power supply, the present invention is not limited to this. For example, a dynamo can be used as the first power supply. In the same manner, a dynamo can be used as the second power supply. As the dynamo, a hub dynamo provided on a hub of a front wheel or a rear wheel of a bicycle, or a block dynamo that generates electric power by contacting a rim of a front wheel or a rim of a rear wheel can be used.

Modified Example 2

The third and fourth embodiments have configurations that include the first battery 2 and the second battery 5. In the third and fourth embodiments, however, electric power may be supplied from the first battery 2 to the operating devices 3a-3d of the operating apparatus 3 in a wired manner without having the second battery 5.

Modified Example 3

In a case where the bicycle control system according to the first embodiment further includes a front suspension device as the electric drive device, electric power may be supplied from the first battery 2 to the front suspension device. In a case where the bicycle control system according to the second to fourth embodiments further includes a front suspension device as the electric drive device, electric power may be supplied from the second battery 5 to the front suspension device.

Modified Example 4

The above-described embodiments include the four electric drive devices 4a-4d. However, the number of the electric drive devices is not limited as long as at least two electric drive devices are included. Also, the above-described embodiments include the four operating devices 3a-3d. However, one operating device is sufficient, and the number of the operating devices is not limited.

Modified Example 5

In the first embodiment, the first battery 2 is provided as a separate member from the operating devices 3a-3d and the electric drive devices 4a-4d. However, the first battery 2 may be provided integrally with any one of the operating devices 3a-3d and the electric drive devices 4a-4d.

Modified Example 6

In the second to fourth embodiments, the first battery 2 may be provided integrally with any one of the operating devices 3a-3d and the electric drive devices 4a-4d, and the second battery 5 may be provided integrally with any one of the operating devices 3a-3d.

Modified Example 7

Figure 7:
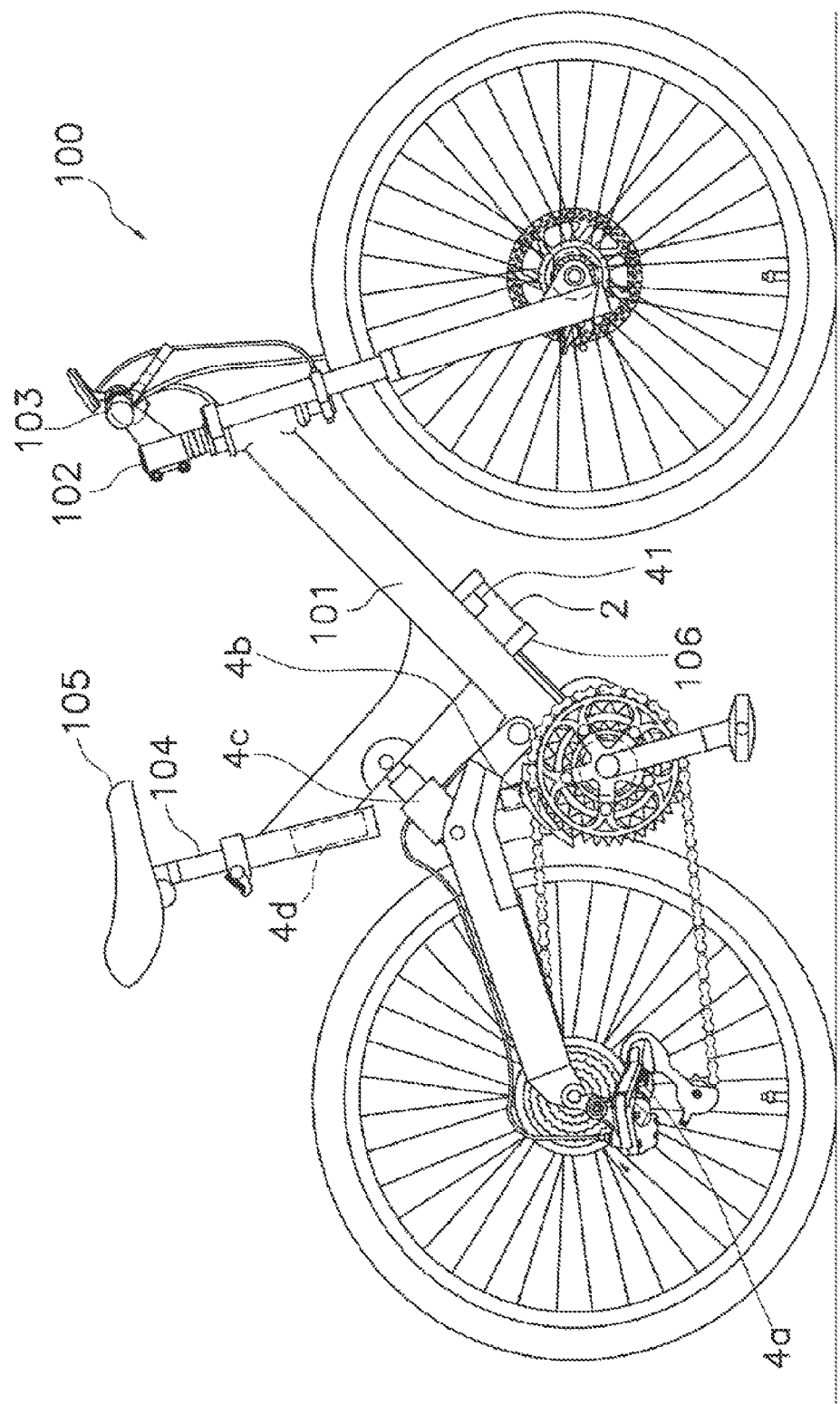
FIG. 7 is a side elevational view of a bicycle that is equipped with a bicycle control system in accordance with a seventh modified example.

In the third and fourth embodiments, the first wireless communication unit 41 is attached in the vicinity of the stem 102 of the frame main body 101. However, the present invention is not limited to this. For example, as shown in FIG. 7, the first battery 2 is retained in a retaining member 106 which is attached to the main body of the bicycle. The first battery 2 may be retained in the retaining member 106 in a detachable manner. The first wireless communication unit 41 is attached to the retaining member 106. Alternatively, the first wireless communication unit 41 may be disposed in the first battery 2. In this case, the first wireless communication unit 41 can be detached from the retaining member 106 together with the first battery 2. In the present invention, the main body of the bicycle may include the frame main body 101, the seat post 104, a saddle 105, a basket (not shown in the drawings), and the like.

Modified Example 8

Figure 8:
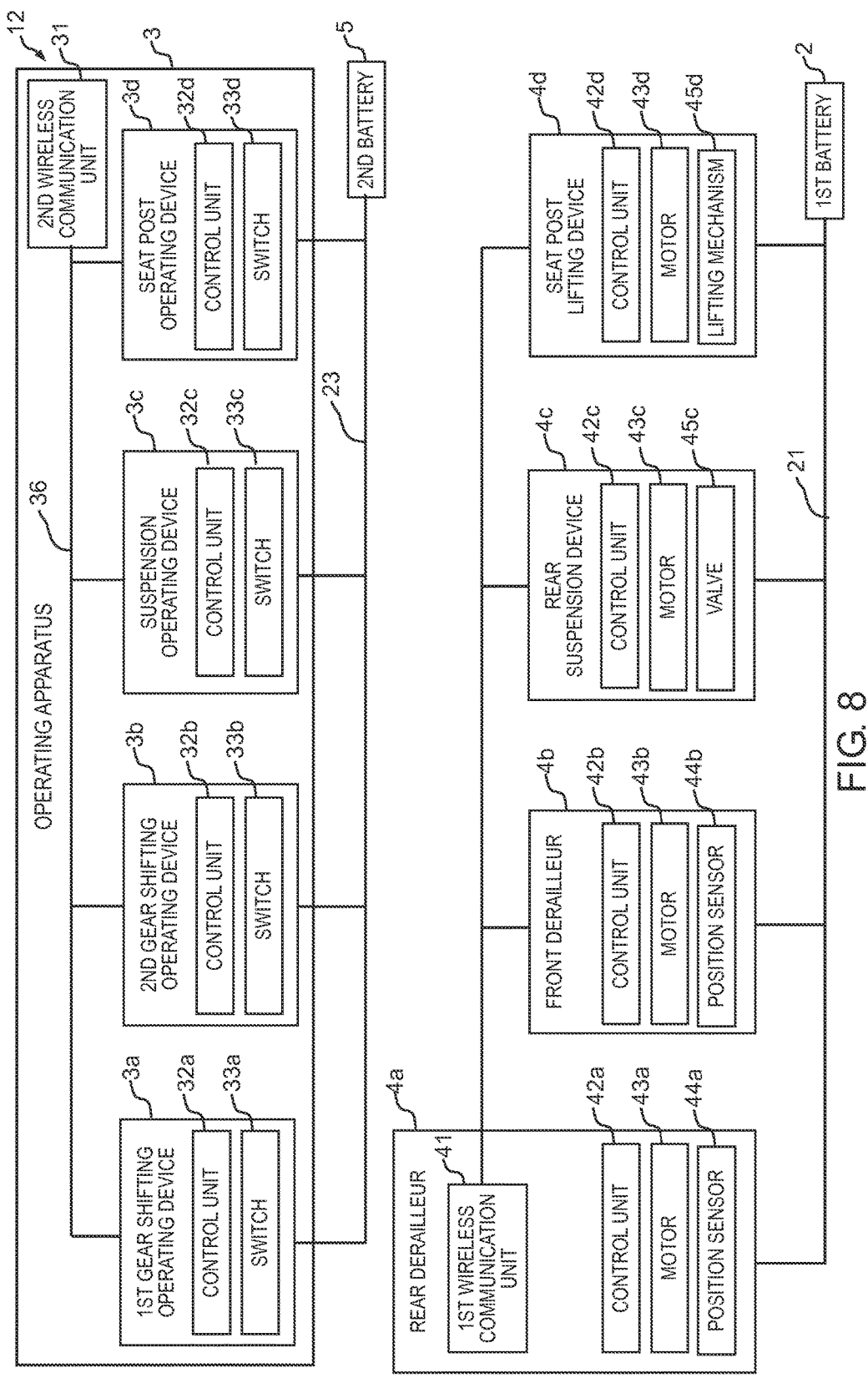
FIG. 8 is a block diagram of a bicycle control system in accordance with an eighth modified example.

In the third and fourth embodiments, the first wireless communication unit 41 is provided as a separate member from the electric drive devices 4a-4d. However, the present invention is not limited to this. For example, as shown in FIG. 8, the first wireless communication unit 41 may be included in any one of the electric drive devices 4a-4d.

Modified Example 9

Figure 9:
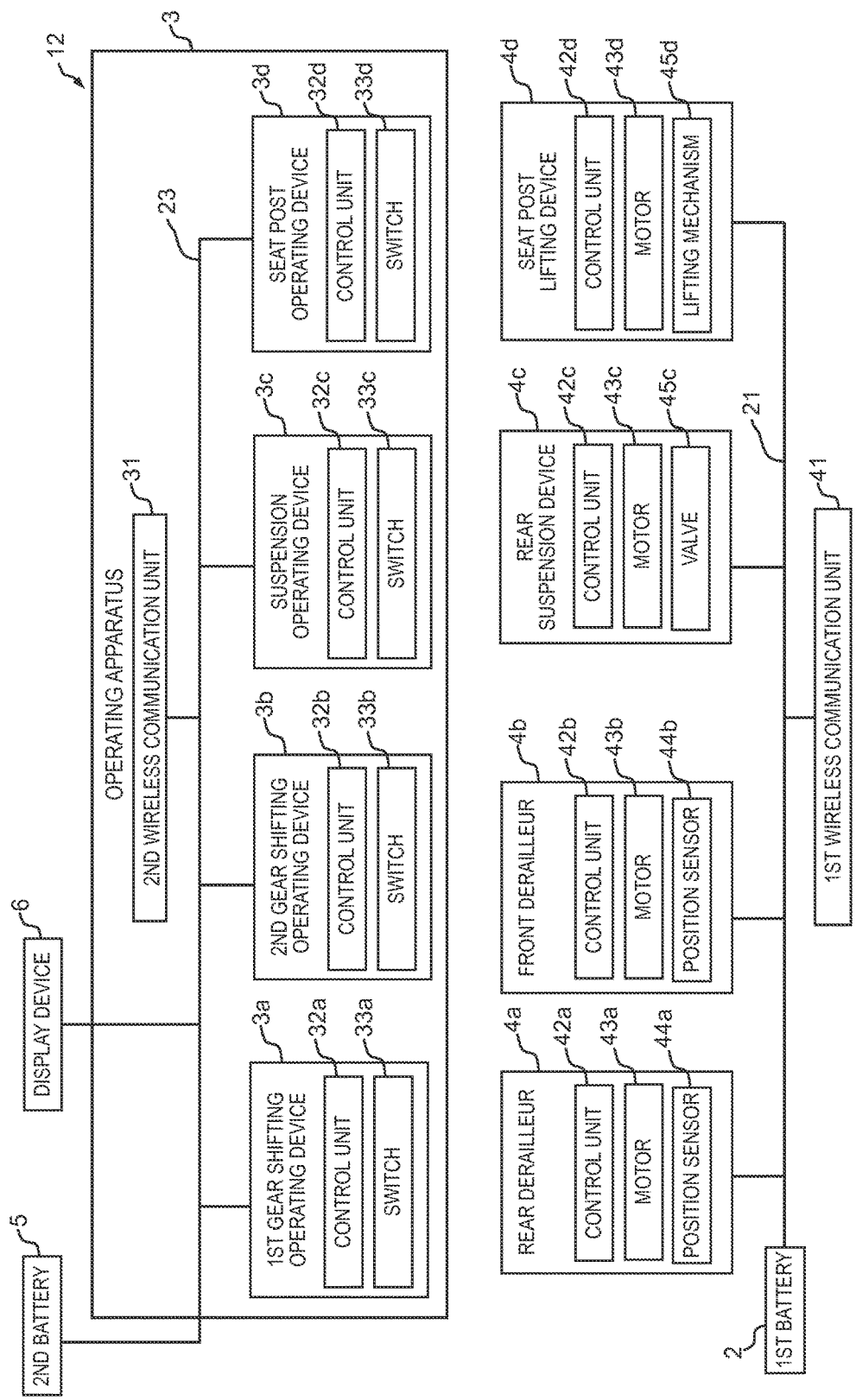
FIG. 9 is a block diagram of a bicycle control system in accordance with a ninth modified example, a tenth modified example, and an eleventh modified example.

In the third and fourth embodiments, the first wireless communication unit 41 can communicate with the electric drive devices 4a-4d through the cable 46. However, the present invention is not limited to this. For example, as shown in FIG. 9, the first wireless communication unit 41 may be able to communicate with the electric drive devices 4a-4d through the electric power line 21. That is, the first wireless communication unit 41 may be able to communicate with the electric drive devices 4a-4d through power line communication (PLC).

Modified Example 10

In the third and fourth embodiments, the second wireless communication unit 31 can communicate with the operating devices 3a-3d through the cable 36. However, the present invention is not limited to this. For example, as shown in FIG. 9, the second wireless communication unit 31 may be able to communicate with the operating devices 3a-3d through the electric power line 23. That is, the second wireless communication unit 31 may be able to communicate with the operating devices 3a-3d through power line communication (PLC).

Modified Example 11

In a case where a display device is connected to the operating apparatus 3 in the first to fourth embodiments, the display device is connected to the operating apparatus 3 through a cable or an electric power line. Specifically, a display device 6 may communicate with the second wireless communication unit 31 and the operating devices 3a-3d through power line communication (PLC).

Modified Example 12

The electric drive devices are not limited to the above-described examples. Similarly, the operating apparatus is not limited to the above-described examples. For example, in a case in where a display device is provided in the embodiment of FIG. 2, electric power may be supplied from the first battery 2 to the display device through the electric power line 21, and a wireless communication unit may be provided in the display device to be able to wirelessly communicate with the first wireless communication unit 41 and the second wireless communication unit 31.

Thus, the foregoing descriptions of the embodiments according to the present invention are provided for illustration only, and not fir the purpose of limiting the invention as defined by the appended claims and their equivalents.

What is claimed is:

1. A bicycle control system comprising:
a first power supply;
a plurality of electric drive devices each directly connected to the first power supply through a single power supply line to receive electric power supplied from the first power supply and each selected from the group consisting of a transmission device, a suspension device and a seat post lifting device;
at least one first wireless communication unit operatively connected to at least one of the electric drive devices;
an operating apparatus wirelessly operating the electric drive devices by wireless signals, the operating apparatus including at least one second wireless communication unit that transmits a wireless signal to the at least one first wireless communication unit; and
a second power supply electrically coupled to the operating apparatus to supply electric power to the operating apparatus,
each of the plurality of electric drive devices operated in response to the wireless signal received by the at least one first wireless communication unit.

2. The bicycle control system according to claim 1, wherein
the operating apparatus is electrically coupled to the first power supply to receive electric power supplied from the first power supply.

3. The bicycle control system according to claim 1, wherein
the electric drive devices and the first power supply are configured to be attachable to a frame main body of a bicycle.

4. The bicycle control system according to claim 1, wherein
the at least one first wireless communication unit is configured to be attachable in a vicinity of a stem of a frame main body of a bicycle.

5. The bicycle control system according to claim 1, wherein
the first power supply is retained in a retaining member that is configured to be attached to the main body of the bicycle, and
the at least one first wireless communication unit is attached to the retaining member.

6. The bicycle control system according to claim 1, wherein
the at least one first wireless communication unit is disposed in the first power supply.

7. The bicycle control system according to claim 1, wherein
the at least one first wireless communication unit is included as a part of one of the electric drive devices.

8. The bicycle control system according to claim 1, wherein
the at least one first wireless communication unit is configured to communicate with each of the electric drive devices through the power supply line.

9. The bicycle control system according to claim 1, wherein the operating apparatus includes a plurality of operating devices, and the at least one second wireless communication unit transmits wireless signals to the at least one first wireless communication unit in response to operation of the operating devices.

10. The bicycle control system according to claim 1, wherein the operating apparatus includes a plurality of operating devices, and the at least one second wireless communication unit includes a separate second wireless communication unit for each of the operating devices.

11. The bicycle control system according to claim 1, wherein the at least one first wireless communication unit includes a separate first wireless communication unit for each of the electric drive devices, and the at least one second wireless communication unit communicates with the separate first wireless communication units.

12. The bicycle control system according to claim 11, wherein the operating apparatus includes a plurality of operating devices, and the at least one second wireless communication unit transmits wireless signals in response to operation of the operating device.

13. The bicycle control system according to claim 1, wherein the first power supply includes one of a primary battery and a secondary battery.

14. The bicycle control system according to claim 1, wherein the second power supply includes one of a primary battery and a secondary battery.

15. The bicycle control system according to claim 1, wherein the electric drive devices include at least two of a front transmission device, a rear transmission device, a front suspension device, a rear suspension device and a seat post lifting device.

16. The bicycle control system according to claim 1, wherein the operating apparatus includes an operating device that includes at least one of a gear shifting operating device, a suspension operating device and a seat post operating device.

17. The bicycle control system according to claim 1, wherein the plurality of electric drive devices includes at least one transmission device and at least one suspension device, and the at least one transmission device and the at least one suspension device are electrically coupled to the first power supply.

18. The bicycle control system according to claim 1, wherein the operating apparatus and the second power supply are configured to be attached to a handlebar of a bicycle.

19. The bicycle control system according to claim 1, wherein the second power supply includes a dynamo.

20. A bicycle control system comprising:

a first power supply;

a plurality of electric drive devices each directly connected to the first power supply through a single power supply line to receive electric power supplied from the first power supply and each selected from the group consisting of a transmission device, a suspension device and a seat post lifting device;

at least one first wireless communication unit operatively connected to at least one of the electric drive devices;

an operating apparatus wirelessly operating the electric drive devices by wireless signals, the operating apparatus including at least one second wireless communication unit that transmits a wireless signal to the at least one first wireless communication unit; and a second power supply electrically coupled to the operating apparatus to supply electric power to the operating apparatus, each of the plurality of electric drive devices operated in response to the wireless signal received by the at least one first wireless communication unit, and the second power supply provided integrally with the operating apparatus.

21. The bicycle control system according to claim 20, wherein the second power supply includes a dynamo.

* * * * *